Feb. 7, 1961
B. M. SMALLEY
2,970,800
SUPPORT FOR ELECTRICAL DEVICES
Filed Oct. 14, 1957
2 Sheets-Sheet 1
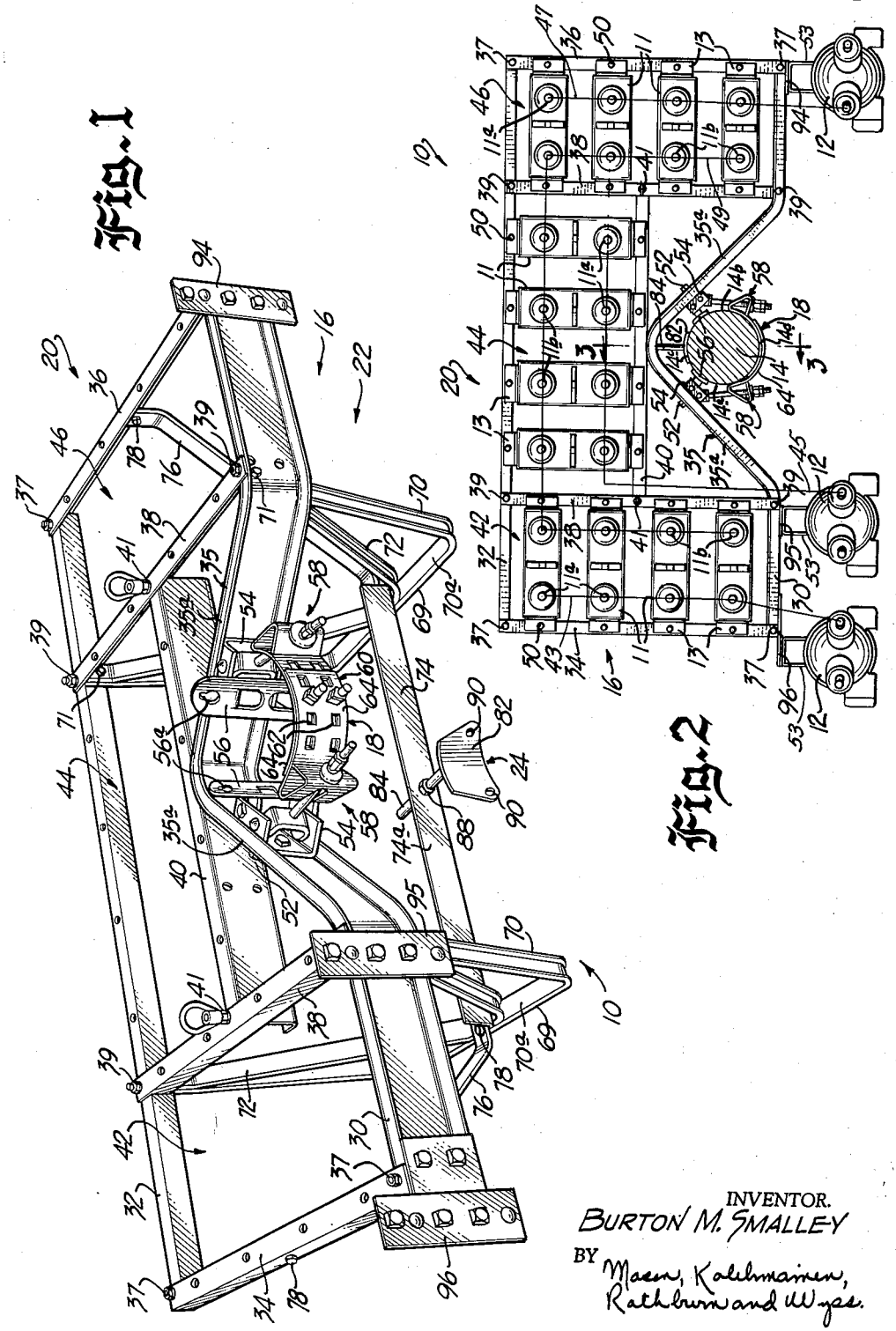
INVENTOR.
BURTON M. SMALLEY
BY Mason, Kolehmainen,
Rathburn and Wyss.

Feb. 7, 1961
B. M. SMALLEY
2,970,800
SUPPORT FOR ELECTRICAL DEVICES
Filed Oct. 14, 1957
2 Sheets-Sheet 2
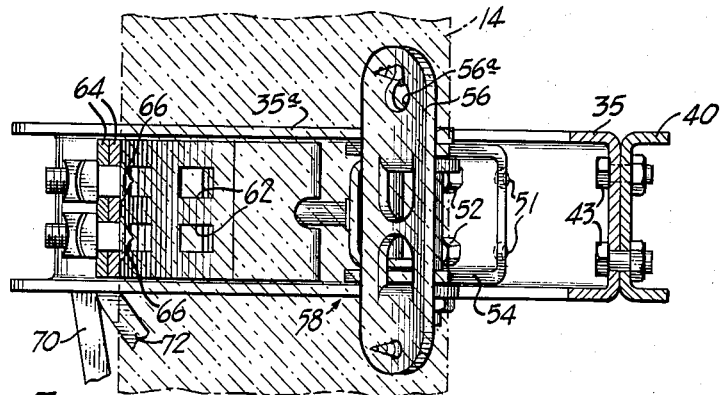
Fig. 3
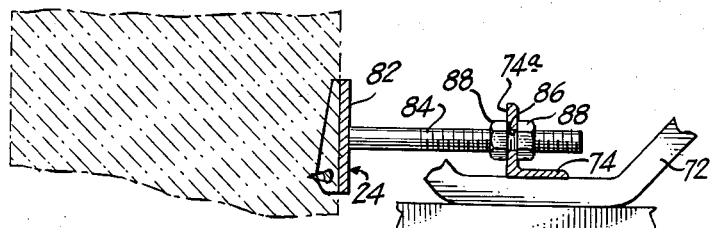
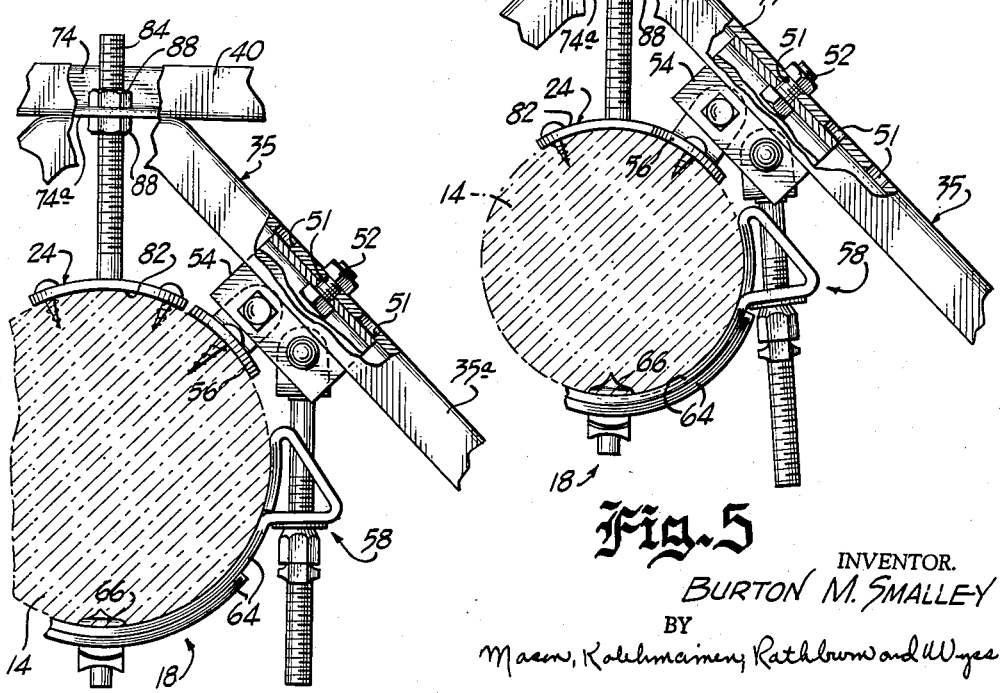
Fig. 4
Fig. 5
INVENTOR.
BURTON M. SMALLEY
BY
Mason, Kolehmainen, Rathburn and Wyss.
ATTORNEYS.

2,970,800
Patented Feb. 7, 1961

United States Patent Office

2,970,800

SUPPORT FOR ELECTRICAL DEVICES

Burton M. Smalley, Highland Park, Ill., assignor to Joslyn Mfg. & Supply Co., Chicago, Ill., a corporation of Illinois Filed Oct. 14, 1957, Ser. No. 689,839

9 Claims. (Cl. 248—230)

The present invention relates generally to a support for electrical devices and particularly to a support for mounting a plurality of capacitors at an elevated location on a pole or the like. This application is a continuation in part of applicant's copending application Serial No. 637,311, filed January 30, 1957 now patent No. 2,883,136, which application discloses an improvement of the structure shown in applicant's copending application Serial No. 481,581, filed January 13, 1955 now Patent No. 2,883,135, both of these applications being assigned to the same assignee as the present invention.

It is an object of the present invention to provide a new and improved support for a plurality of electrical devices, which support is capable of being attached to poles of different size having any of the diameters conventionally encountered in electrical distribution systems.

It is another object of the present invention to provide a new and improved support which disposes a plurality of electrical devices around a pole in such a manner as to leave a climbing space for poleline workmen.

It is a further object of the present invention to provide a support which carries a plurality of electrical devices on three sides of a supporting pole thereby distributing the weight of the capacitors about the pole and minimizing the pole bending moment.

It is another object of the present invention to provide a support which is adapted to be leveled relative to a supporting pole by means of a relatively simple adjustment.

It is a further object of the present invention to provide a support for a plurality of electrical devices which support includes downwardly extending feet for spacing the electrical devices above the ground as, for example, during assembly of the electrical devices upon the support, which feet include adjustable means for leveling the support relative to a supporting pole.

The above and other objects are realized in accordance with the present invention by providing an electrical device support comprising a bracket having an upper electrical device supporting section and a lower leg section together with an adjustable clamping assembly for securing the bracket at any desired height upon a supporting pole. The clamping assembly is adapted to be adjusted to conform to the pole diameter. The upper supporting section includes a frame formed of longitudinal side member interconnected by a plurality of transverse support arms, one of said longitudinal side members being a channel provided with an inwardly offset V-shaped portion to which is attached the adjustable clamping assembly. The electrical devices, for example, capacitors, are supported upon the frame and are arranged in rows around the inwardly offset V-shaped portion so that the capacitors are supported substantially around three sides of the pole while, at the same time, an adequate amount of space is provided along the fourth pole side to permit workmen to climb up and down the pole. The lower leg section of the bracket includes spaced apart leg members for spacing the capacitors above the ground when the support is rested on the ground as, for example, during assembly of the capacitors. An adjustable kicker is supported between the leg members for engagement with the pole at a point below the adjustable clamping means. The kicker may be adjusted to maintain the frame level for any adjustment of the bracket to correspond to the diameter of the pole.

The invention both as to its organization and method of operation, together with further objects and advantages thereof, will best be understood by reference to the following description, taken in connection with the accompanying drawings in which:

Fig. 1 is a perspective view of an electrical device cluster support embodying the features of the present invention;

Fig. 2 is a reduced top plan view of the support of Fig. 1, shown supporting a plurality of capacitors and switches upon a pole;

Fig. 3 is an enlarged fragmentary sectional view taken along a line substantially corresponding to line 3—3 of Fig. 2;

Fig. 4 is an enlarged fragmentary top plan view of the support of Fig. 1, shown as used with a pole of large diameter; and Fig. 5 is an enlarged fragmentary top plan view of the support of Fig. 1, shown as used with a pole of small diameter.

Referring now to the drawings, and particularly to Fig. 2, an electrical device support 10 embodying the principles of the present invention is there shown supporting a plurality of capacitors 11 and oil switches 12 at a selected elevation on a pole 14. The support 10 briefly comprises a bracket 16 and a universal clamping assembly 18 which is similar to the assembly described and claimed in the above-identified copending application Serial No. 637,311. The bracket 16 includes an upper capacitor supporting frame 20 which supports angulated flanges 13 welded to the sides of the capacitors 11, the capacitors 11 being disposed in rows within the frame 20 as indicated in Fig. 2. As is best shown in Fig. 1, the bracket 16 further includes a lower leg section 22, adapted to space the capacitors 11 above the ground when the latter are being assembled upon the frame 20. An adjustable kicker 24 is supported from the leg section 22 and is engageable with the surface of the pole 14 at a point spaced below the portion of the pole engaged by the universal clamping assembly 18, the kicker 24 being adjustable to level the frame 20 or to change the position of the bracket 16 relative to the pole 14 in order to compensate for variations in pole diameter which might otherwise cause the frame 20 to be skewed.

Referring now to the supporting frame 20 of the bracket 16, it includes a longitudinal channel 30 and a spaced longitudinal angle brace 32, the channel and angle brace being interconnected at their ends by a pair of transverse angle arms 34 and 36 respectively and the members 30, 32, 34 and 36 being secured together by fasteners 37. The center portion channel 30 extends inwardly of the frame 20 to provide a generally V-shaped offset section 35 which accommodates the clamping assembly 18 as described in greater detail hereinafter. A pair of spaced apart intermediate angle arms 38 are respectively connected at their ends by fasteners 39 to points intermediate the ends of the longitudinal channel 30 and the angle brace 32. A short intermediate channel 40 has its ends connected by fasteners 41 to the centers of the spaced angle arms 38, and the channel 40 is further connected at its middle portion to the apex of the V-shaped section 35 by nuts and bolts indicated at 43.

It will thus be appreciated that the above-described members 30, 32, 34, 36, 38 and 40, define three generally rectangular openings 42, 44 and 46, each of which accommodates a group or row of capacitors 11. In order to facilitate mounting of the capacitors 11 upon the bracket 16, there are provided in the angle arms 32, 34, 36 and 38 and in the channel 40 a plurality of spaced apart apertures which accommodate suitable fasteners 50 adapted to secure the angulated flanges 13 on the sides of the capacitors 11 to the frame 20. By this arrangement, the groups of capacitors 11 are arranged in rows respectively extending across the ends and along the side of the frame 20, each row being generally perpendicular to its adjacent row. More specifically, as shown in Fig. 2, the rows of capacitors in openings 42 and 46 extend between the channel 30 and brace 32, while the group of capacitors in opening 44 extends between the intermediate angle arms 38. It should be apparent that the capacitors in openings 42 and 46 are arranged along the opposite sides 14a and 14b of the pole 14, and that the capacitors in opening 44 are arranged along a side 14c of the pole 14 intermediate the sides 14a and 14b. Two advantages are obtained by this construction: first, a clear climbing space for pole workmen or the like on the pole is provided alongside 14d of the pole and, second, the weight of the capacitors is distributed substantially uniformly about three sides of the pole, thereby keeping the pole bending moment to a minimum.

The installation illustrated in Fig. 2 is a 600–KVAR installation on a 7.2/12.5 KV system, each of the capacitors being a 50 KVAR type. In this type of system it is required that the capacitors be switched into and out of service or be switched into and out of the electrical distribution system. To this end, each of the three oil switches 12 is connected to one wire (not shown) in a three wire distribution system (not shown) and, more specifically, the left switch 12, as viewed in Fig. 2, is serially connected by conductor 43 to the outside terminals 11a of the capacitors located in opening 42. The center switch 12 is serially connected by conductor 45 to the inside terminals 11a of the capacitors in opening 44, while the right switch 12, as viewed in Fig. 2, is serially connected by conductor 47 to the outside terminals 11a of the capacitors in the opening 46, the inner terminals 11b of the capacitors in opening 42, the outer terminals 11b of the capacitors in opening 44, and the inner terminals 11b of the capacitors in opening 46 being serially connected together by conductor 49. In order to provide a support for oil switch mountings 53 which are connected to the oil switches 12 by welding or the like, plates 94, 95 and 96 are secured in spaced apart locations by suitable fasteners to the channel 30.

The universal clamping assembly 18, described in detail in the above-identified application Serial No. 637,311, is attached to the pole 14 and serves to support the frame 20 at the offset portion 35 of the channel 30. As is best shown in Fig. 4, sets of spaced apart horizontally aligned apertures 51 are provided in each leg 35a of the offset portion 35 to accommodate suitable detachable fasteners 52 which secure the universal clamping assembly 18 to the frame 20. Briefly, the universal clamping assembly 18 comprises a pair of intermediate members 54 each of which is secured to the web portion of one of the legs 35a by means of a fastener 52. Each of the members 54 is pivotally supported upon a pole engaging foot 56 which is provided with apertures 56a for accommodating leg screws adapted to be driven into the pole 14. By virtue of the pivotal attachment between the feet 56 and the intermediate members 54, the faces of the feet 56 may be adjusted to lie approximately flush with the surface of the pole, thereby providing a large frictional contact surface between the feet 56 and the pole 14. Moreover, since the intermediate members 54 are adjustably positioned relative to the legs 35a of the frame 20, the universal clamping assembly 18 is able to accommodate poles of different diameters while maintaining the feet 56 spaced apart by approximately an angle of 120°. A clamping means 58 is pivotally supported on each of the intermediate members 54 and each such clamping means functions to draw a band assembly 60 into engagement with the surface of the pole 14. Each of the clamping means 58 is at all times spaced apart from both the pole 14 and the feet 56. In contrast to the clamping assembly described in the above-identified application Serial No. 637,311, the band assembly includes two rows of spaced apart rectangular openings 62 on each of the bands 64, the openings 62 being adapted to aligned to receive a pair of conical head fasteners 66. By employing this construction, the band assembly is considerably lightened and the conical head securing action provided by a single fastener is, of course, doubled.

In order to permit the assembly of the capacitors 11 on the bracket 16 on the ground before the support 10 is placed on the pole 14 while, at the same time, maintaining the capacitors above the ground, the lower leg section 22 is provided. Specifically, this lower leg section comprises two spaced apart legs 69 each of which includes a U-shaped channel 70 and a generally V-shaped channel 72, the ends of which are connected by fasteners 71 intermediate the ends of the longitudinal channel 30 and angle brace 32 and the middle portions of which are in contacting engagement, as best shown in Fig. 1. The legs 69 are maintained in spaced apart relation by an angle iron 74, the ends of which are connected to the middle portion or apex of the channel 72, and by a pair of inclined braces 76, one of which is connected between one end of the angle iron 74 and a point intermediate the ends of the angle arm 34 and the other of which is connected from the opposite end of angle iron 74 to a point intermediate the ends of arm 36. Each of the joints formed by the channels 70, 72, 76 and angle iron 74 is completed by a single common fastener 78. It will be thus appreciated that the generally horizontal portion 70a of the channel 70 rests upon the ground during assembly of the capacitors 11 upon the support 10 and, as a result, these capacitors are not contaminated by moisture, mud, or dirt which might otherwise be absorbed if they were allowed to contact the earth.

For the purpose of leveling the frame 20 and the capacitors 11 after the universal clamping assembly 18 has been attached to the pole 14, the adjustable kicker 24 is provided. It is supported by the angle iron 74 at a point intermediate the spaced apart legs 69 and includes a generally curved pole engaging plate 82 which is suitably secured by welding or the like to the end of a threaded rod 84. The rod 84 is loosely received in an opening 86 located in one flange 74a of the angle iron 74 and accommodates a pair of nuts and washers 88 disposed on opposite sides of the flange 74a, the nuts and washers 88 being used to clamp the rod to the flange 74a and being adjustable to alter the position of the rod 84 and, hence, to move the plate 82 with respect to the angle iron 74. In order to accommodate lag screws 89 for fixedly attaching the pole engaging plate 82 to the pole 14, a pair of spaced apart apertures 90 are located adjacent to the lower edge of the plate 82.

It should be understood that when the support 10 is used with a pole of small diameter, as shown in Fig. 5, the fasteners 52 are located in the set of apertures 51 closest to the apex of the offset portion 35 so that the surface of the pole is located closer to the apex of the offset portion 35 than when the support 10 is used with a pole of larger diameter, as indicated in Fig. 4 where the fasteners 52 are located in the set of intermediate apertures. To compensate for the difference in the position of the pole relative to the support 10, and particularly relative to the lower leg section 22, the nuts 88 of the rod 84 of the adjustable kicker 24 are rotated to move the frame 20 into a level position, irrespective of the diameter of the pole. It should be further observed that adjustment of the kicker 24 and adjustment of the universal clamping assembly 18 may be effected while the support is located on the ground or, alternatively, these adjustments may be effected when the support 10 is attached to the pole 14.

While a particular embodiment of the present invention has been shown and described, it will be understood that numerous changes and modifications will readily occur to those skilled in the art and, it is therefore intended in the appended claims to cover all such changes and modifications as fall within the true spirit and scope of the present invention.

What is claimed and desired to be secured by Letters Patent of the United States is:

1. A support for supporting a plurality of electrical devices at a preselected elevation on a pole comprising a generally rectangular bracket formed by a plurality of interconnected frame members, said members forming first, second, and third support areas for said electrical devices, the first and second of which areas respectively lie along the opposite sides of the bracket, and the third of which areas extends between the first and second areas along the rear of the bracket, said frame members including a front frame member extending along the entire front of the bracket, said front frame member including substantially aligned straight portions respectively extending along the front of said first and second areas, said front frame member further including an inwardly extending offset portion between said straight portions extending rearwardly of the bracket toward said third area, and means carried within the offset portion for securing the support to the pole, the offset portion having a depth and shape adapting the offset portion to encircle a pole of a predetermined diameter with the pole positioned substantially within the offset portion and aligned with the outermost portion of the pole periphery aligned with said straight portions of said front member.

2. A support for supporting a plurality of electrical devices at a preselected elevation on a pole comprising a bracket including a generally rectangular supporting structure, said structure having a longitudinal first side member provided with an inwardly extending offset portion, a plurality of additional side members and a plurality of intermediate members, some of said additional side members and some of said intermediate members interconnecting said longitudinal first side member and another of said additional side members and one of said intermediate members interconnecting said other of said intermediate members, means on at least some of said side and intermediate members for supporting said electrical devices in rows respectively aligned along selected sides of said rectangular supporting structure, and means connected to said offset portion of said longitudinal first side member for securing said bracket to said pole.

3. A unitary support for supporting a plurality of electrical devices in a plurality of rows at a preselected location on a pole, said support comprising a generally rectangular supporting structure including pairs of members for respectively supporting the rows of said electrical devices around a plurality of sides of the pole, one of said members having an offset portion for receiving the pole so that said rows extend opposite said pole sides, the offset portion of said member having a depth and slope adapting the offset portion to encircle a pole of a predetermined diameter with the pole positioned substantially within the offset portion and aligned with the outermost portion of the pole periphery substantially aligned with said one of said members, a leg structure depending therefrom beneath said supporting structure, and an adjustable means mounted on said leg structure for positioning said supporting structure relative to said pole.

4. A unitary support adapted to support a plurality of electrical devices in a plurality of rows at a preselected location on a pole, said support comprising a generally rectangular upper structure including a pair of longitudinal side members interconnected by a plurality of transverse members, selected portions of at least some of said longitudinal side and transverse members adapted to support rows of electrical devices, one of said longitudinal members having an offset portion for receiving the pole; an adjustable assembly connected to one of said longitudinal side members for securing the offset portion to the pole; a lower structure including a pair of transverse legs depending from said upper structure and a longitudinally extending support member connected to said transverse legs; and an adjustable kicker supported from said longitudinally extending support member and adapted to be adjusted to change its effective length to level the support irrespective of the diameter of the pole.

5. A unitary support for supporting a plurality of electrical devices in a plurality of rows at a preselected location on a pole, said support comprising a generally rectangular upper structure for supporting said rows of electrical devices with two of said rows of electrical devices extending alongside the respective ends of a third row of electrical devices and substantially perpendicular thereto, and including a pair of longitudinal side members, a plurality of transverse members interconnecting said longitudinal side members, selected portions of said members adapted to support said rows of electrical devices, one of said longitudinal members having an offset portion for receiving the pole; clamping means connected to said offset portion for engaging said pole for securing the offset portion to the pole, the offset portion having a depth and slope adapting the offset portion to encircle a pole of a predetermined diameter with the pole positioned substantially within the offset portion and aligned with the outermost portion of the pole periphery substantially aligned with said one of said longitudinal members; and a lower adjustable means secured to said support for leveling the support irrespective of the diameter of the pole.

6. A unitary support forming a plurality of support areas for supporting a plurality of rows of electrical devices at a preselected location on a pole, said support comprising a generally rectangular upper structure forming said areas adapted to support electrical devices with two of said areas extending alongside the respective ends of a third area and substantially perpendicular thereto, a first longitudinal side member parallel to the longitudinal axis of said third area and extending alongside the ends of said two areas, a second longitudinal side member extending alongside the opposed ends of said two areas, a plurality of transverse members interconnecting said side members, at least some of said transverse members being parallel to the longitudinal axis of said two areas for supporting two rows of said electrical devices, said second longitudinal member having an offset member for receiving the pole, clamping means within said offset member and connected to said support for engaging said pole for securing the pole within the offset portion, the offset portion having a depth and slope adapting the offset portion to encircle a pole of a predetermined diameter with a pole positioned substantially within the offset portion and aligned with the outermost portion of the pole periphery substantially aligned with said second of said longitudinal members; and a lower adjustable means secured to said support for leveling the support irrespective of the diameter of the pole.

7. A unitary support forming a plurality of support areas for supporting a plurality of rows of electrical devices at a preselected location on a pole, said support comprising a generally rectangular upper structure including a pair of longitudinal side members interconnected by a plurality of transverse members, selected portions of said members forming said areas for supporting the rows of electrical devices, one of said longitudinal members having an offset portion for receiving the pole; clamping means connected to said offset portion and adapted to engage only the periphery of said pole for securing the pole with the offset portion; a lower structure including a pair of transverse legs depending from said upper structure and a longitudinally extending support connected to said transverse legs; and an adjustable kicker supported from said longitudinally extending support and adapted to be adjusted to change its effective length to level the support irrespective of the diameter of the pole.

8. A unitary support forming a plurality of support areas for supporting a plurality of rows of electrical devices at a preselected location on a pole, said support comprising a generally rectangular supporting structure including pairs of members for respectively supporting the rows of said electrical devices around a plurality of sides of the pole, one of said members having an offset portion, a pair of pivotal pole engaging feet extending from any one of a plurality of selected positions longitudinally along said offset portion of said one member and adapted to be adjusted into a radial line with said pole, and a clamping assembly of adjustable length secured to said offset portion and adapted to be secured around a portion of said pole by a pair of pivotal clamping bolts to accommodate poles of various diameter, said support adapted to being securely held to said pole by said feet and said clamping assembly, a leg structure beneath said supporting structure and connected to said supporting structure, and an adjustable means mounted on said leg structure for positioning said bracket relative to said pole.

9. A support as set forth in claim 1 wherein said offset portion is generally V-shaped.

References Cited in the file of this patent

UNITED STATES PATENTS

| | | |
|---|---|---|
| 96,773 | Burnham | Nov. 16, 1869 |
| 1,074,838 | Cox | Oct. 7, 1913 |
| 1,230,992 | Brigham | June 26, 1917 |
| 2,375,214 | Creedon | May 8, 1945 |
| 2,827,908 | Lee | Mar. 25, 1958 |
| 2,871,416 | Steinbarge | Jan. 27, 1959 |

OTHER REFERENCES

"Improved Design Transformer Mounts," Bulletin No. 651, Universal Pole Bracket Corporation (copy in Div. 52).